United States Patent [19]

Braun et al.

[11] Patent Number: 4,799,238

[45] Date of Patent: Jan. 17, 1989

[54] DIFFERENTIAL PHASE SHIFT KEYING METHOD FOR THE TRANSMISSION OF DATA

[75] Inventors: Walter Braun, Wettingen; Walter Hagmann, Dättwil, both of Switzerland

[73] Assignee: BBC Brown Boveri AG, Baden, Switzerland

[21] Appl. No.: 73,719

[22] Filed: Jul. 15, 1987

[30] Foreign Application Priority Data

Jul. 23, 1986 [CH] Switzerland ............... 2948/86

[51] Int. Cl.$^4$ .................. H04L 27/18; H04B 13/00
[52] U.S. Cl. .................. 375/56; 375/57; 340/310 R
[58] Field of Search .......... 375/44, 52, 56, 57, 375/67, 83, 84, 85, 51, 58; 329/104, 110; 332/11 R, 16 R; 340/310 R

[56] References Cited

U.S. PATENT DOCUMENTS

| | | | |
|---|---|---|---|
| 3,739,277 | 6/1973 | Schneider et al. | 375/56 |
| 3,980,824 | 9/1976 | Lamb et al. | 375/56 |
| 4,101,834 | 7/1978 | Stutt et al. | 375/57 |
| 4,302,844 | 11/1981 | Bruene | 375/58 |
| 4,706,261 | 11/1987 | Torre et al. | 375/56 |

*Primary Examiner*—Benedict V. Safourek
*Attorney, Agent, or Firm*—Oblon, Fisher, Spivak, McClelland & Maier

[57] ABSTRACT

A PSK data transmission method wherein in the presence of disturbances which are harmonics of a common fundamental frequency, the disturbance signals are eliminated by the fact that the symbol duration (T) of the data symbols, to be transmitted, of a baseband signal (B(t)) is selected in such a manner that the period duration of the disturbance signal (S(t)) is an integral multiple N.T of the symbol duration. By forming the difference between symbols separated by N intervals from each other at the receiver side, the disturbance signal (S(t)) is completely suppressed while the data rate can be arbitrarily determined via the choice of N.

6 Claims, 3 Drawing Sheets

DIFFERENTIAL PHASE SHIFT KEYING METHOD FOR THE TRANSMISSION OF DATA

FIELD OF THE INVENTION

This invention generally relates to a method for the transmission of data. In particular, it relates to such a method for data which are present as a sequence of symbols having a particular symbol duration and in which method the symbols are modulated by means of phase shift keying onto a carrier frequency, are transmitted and are detected at the receiver side.

DISCUSSION OF BACKGROUND

In some transmission channels, for example in the high- or medium-voltage systems with low system frequency (50 or 60 Hz), the significant disturbances consist of the various harmonics of the fundamental system frequency. Data transmission via such distribution systems must therefore take into consideration especially these harmonically related disturbances.

Several proposals have been made to suppress such harmonic disturbances during data transmission. Thus, a transmission method is known in which the data are transmitted by means of phase shift keying of a carrier frequency which is exactly in the center between two adjacent harmonics of the fundamental frequency, for example from U.S. Pat. No. 4,302,844 or from the article by J. T. Tengdin, "Field tests show AMRAC IV plc communication is promising", Modern Power Systems, June 1985, pages 57 et sequ.

The power spectrum of this phase shift keyed oscillation obeys a $(\sin x/x)^2$ function symmetrically with respect to the carrier frequency. If then the symbol duration of the data symbols used for the phase shift keying is selected to be equal to twice the period duration of the fundamental disturbance frequency, the harmonics of this fundamental frequency are exactly located in the nulls of the signal power spectrum and can thus be suppressed on the receiver side by a suitable filter without impairment of the useful signal.

However, the known transmission method is restricted in its data rate to the comparatively low value of half the fundamental frequency because of the special choice of symbol duration with respect to the fundamental disturbance frequency which is not freely selectable. With a system frequency of 50 or 60 Hz, this corresponds to a data rate of 25 or 30 Baud, respectively.

SUMMARY OF THE INVENTION

Accordingly, one object of this invention is to provide a novel method for the transmission of data which enables a much higher data rate to be achieved with the same insensitivity to disturbances occuring as harmonics of a fundamental frequency.

In a method of the type initially mentioned, the object is achieved by the fact that the phase shift keying is carried out differentially (in the form of so-called DPSK=Differential Phase Shift Keying), as a carrier frequency, a frequency is used which is equal to a harmonic of the fundamental frequency, the symbol duration is selected in such a manner that the period of the fundamental frequency is N-times the symbol duration (N=1, 2, 3, . . . ), and at the receiver side, the difference of two symbols is formed which are in each case separated by N symbol intervals.

Thus, an important feature of the present invention consists in utilizing the periodicity of the disturbances which is equal to the periodicity of the fundamental oscillation in order to eliminate the disturbances by forming the difference of samples which are separated from each other by exactly one such period, without losing the useful information.

Since the possible data rate in the method according to the invention is proportional to N and N can be freely selected, very high data rates can be implemented whilst at the same time suppressing the harmonic disturbances.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

For a better understanding, the invention, in a special illustrative embodiment, will first be compared with the prior art in the text which follows before it is then described in its general form.

Figure 1A:
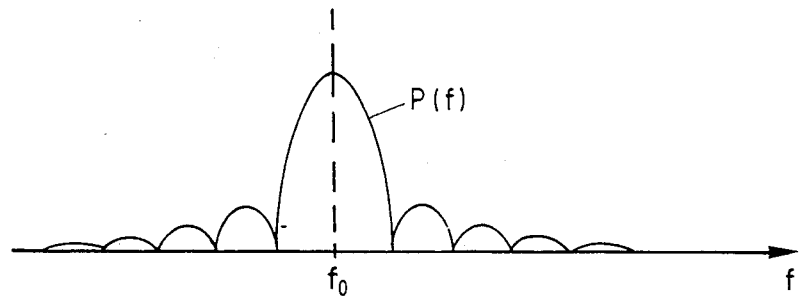
FIG. 1A is a graph showing the spectral power distribution of a phase shift keyed signal.

The hard phase shift keying of a carrier oscillation with the carrier frequency $f_o$ by a sequence of binary data provides a spectral power distribution P(f) against frequency f which is reproduced in FIG. 1A and obeys the relationship $$P(f) \sim |\sin\pi(f-f_o)T/\pi(f-f_o)T|^2 \tag{1}$$

(T is the symbol duration of the symbols the sequence of which represents the data).

Because of the periodicity of the sin function in (1), the spectral power distribution P(f) has equidistant nulls in its spectrum on both sides of the carrier frequency $f_o$.

This characteristic has been utilized in the prior art to effectively suppress disturbances which are harmonics of a common fundamental frequency $f_G$, without impairing the transmission of the information itself.

Figure 1B:
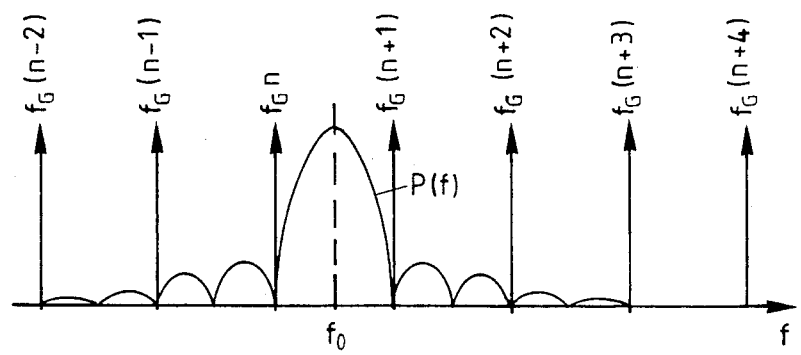
FIG. 1B shows the positioning of a distribution according to FIG. 1A in a spectrum of harmonic disturbance frequencies in accordance with the prior art.

For this purpose, the carrier frequency of is placed in a predetermined discreet spectrum of the form $n \cdot f_G$ ($n=1, 2, 3, \ldots$) as shown in FIG. 1B and known from the article initially quoted, exactly into the middle between two adjacent harmonics (for example $n \cdot f_G$ and $(n+1)f_G$ in FIG. 1B) and the symbol duration T is selected in such a manner that it corresponds to twice the period duration of the fundamental frequency $f_G$.

Under these conditions, the harmonic oscillations $n \cdot f_G$ of the fundamental frequency $f_G$ are located exactly in the nulls of the spectral power distribution P(f) and can be suppressed by a filter having a sinx/x characteristic at the receiver side without impairing the data transmission.

As has already been mentioned, the data rate in this known method is restricted to a value of $f_G/2$ by the choice of conditions. In the case of a data transmission via distribution systems having a fundamental disturbance frequency $f_G$ of 50 or 6 Hz, this results in data rates of only 25 or 30 Bauds, respectively.

In phase shift keyed data transmission, DPSK modulation (Differential Phase Shift Keying) is now frequently used, in which the information to be transmitted is contained in the phase change between two adjacent states and which avoids synchronisation problems between transmitter and receiver side.

Using the special characteristics of DPSK modulation, the data rate achievable with the transmission can be doubled as compared with the prior art in accordance with a special illustrative embodiment of the invention.

Figure 2:
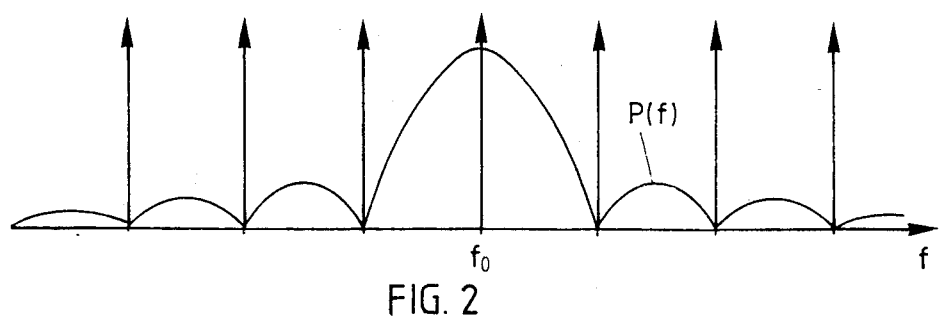
FIG. 2 is a graph showing the positioning of a distribution according to FIG. 1A in a spectrum of harmonic disturbance frequencies according to an illustrative embodiment of the invention with N=1.

For this purpose, the carrier frequency $f_o$ of the DPSK signal is placed, as shown in FIG. 2, not between two adjacent harmonics but exactly onto a harmonic of the fundamental frequency $f_G$ and the symbol duration T is selected in such a manner that it is equal to the period duration of the fundamental frequency $f_G$.

Under the above conditions, the harmonic disturbance frequencies on both sides of $f_o$ are again located in the nulls of the spectral power distribution whereas the harmonic which is equal to the carrier frequency $f_o$ is placed in the middle of the main area of the signal spectrum and must therefore be eliminated in a different manner.

Figure 3:
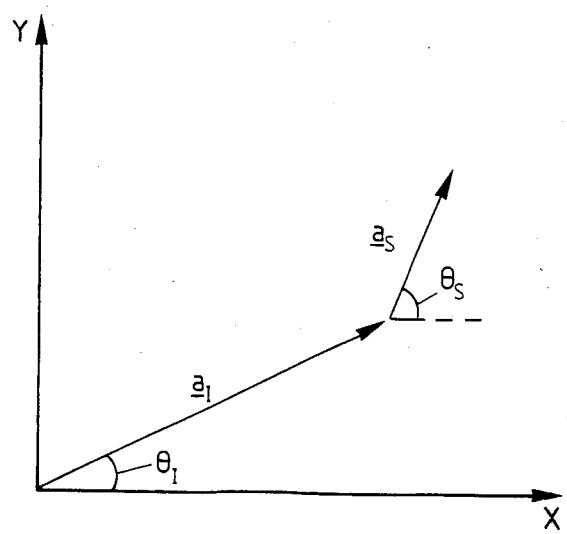
FIG. 3 is a graph showing the vector representation of a disturbed phase shifted keyed signal with the useful-signal vector $a_S$ and the disturbance signal vector $a_F$.

According to FIG. 3, the received signal r(t) can be represented as the vector sum of a useful-signal vector $a_S$ and a disturbance-signal vector $a_I$ in the complex plane $$r(t) = a_S(t) + a_I(t) \tag{2}$$

Transition to the imaginary section results in:

$$r(t) = a_S \sin(\omega_o t + \theta_S) + a_I \sin(\omega_o t + \theta_I) \tag{3}$$

with the phase constants $\theta_S$, $\theta_I$ and the amplitudes $a_S = +1$ (corresponding to phase jumps of 180°) and $a_I$=const., and $\omega_o = 2\pi f_o$.

To process the received signal r(t) in a suitable manner, a vector receiver is used which forms the difference between the vectors at time kT and time (k−1)T:

$$r(kT) - r((k-1)T) \tag{4}$$

Since the harmonic disturbance frequency located at $f_o$ is periodic with symbol duration T, it always drops out when this difference is formed. The remaining quantity is the difference between two adjacent useful-signal vectors which can be 0 or $2a_S$, depending on whether the phase changes or not.

In this manner, the information contained in the phase difference between two adjacent states is detected and, at the same time, the disturbance factor located in the middle of the useful-signal spectrum is eliminated.

On the basis of this special example of the data transmission according to the invention, which enables the data rate to be doubled (by halving the symbol duration T), a generalization leading to arbitrary data rates can be obtained whilst retaining the principle of forming the difference.

The spectrum of harmonic disturbance frequencies of a common fundamental frequency $f_G$ can be represented as periodic (non-sinusoidal) oscillation having the period duration $1/f_G$.

Figure 4:
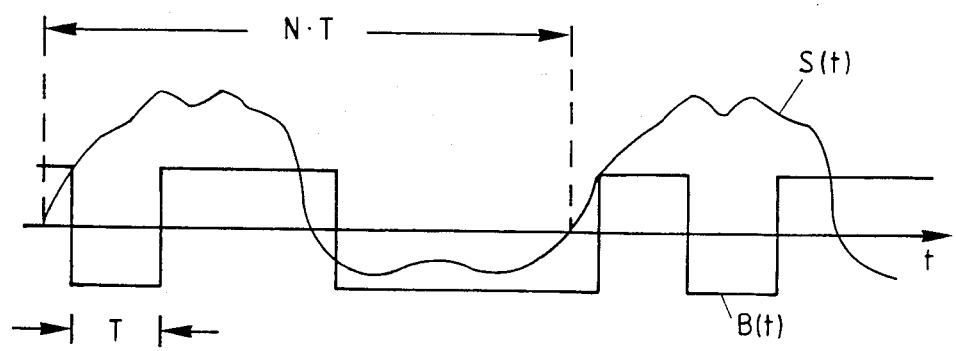
FIG. 4 is a waveform diagram showing time relationship between the baseband signal B(t) and the disturbance signal S(t) in the transmission method according to the invention in its general form.

If the symbol duration T is then selected in such a manner that the period duration $1/f_G$ of the disturbance signal S(t) is an integral multiple of symbol duration T in the baseband signal B(t) (FIG. 4):

$$1/f_G = N \cdot T \ (N=1, 2, 3, \ldots), \tag{5}$$

the entire disturbance spectrum can be eliminated by forming in each case at the receiver side the difference between symbols which are separated by N symbol intervals since the disturbance signal S(t) again assumes the same value after time N·T and thus drops out when the difference is formed.

Figure 5A:
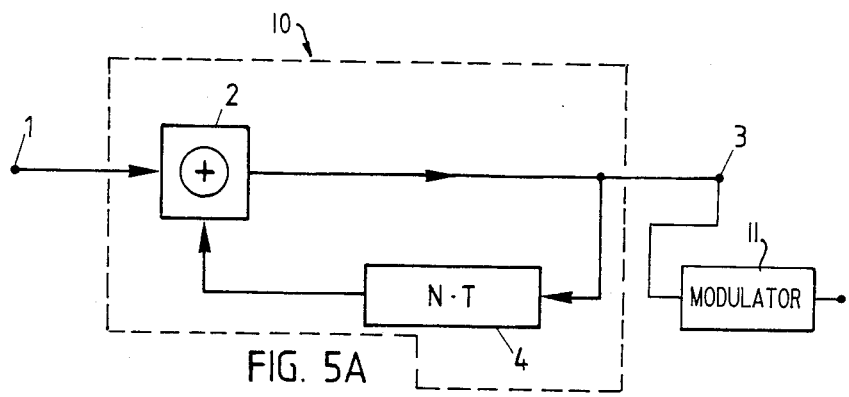
FIG. 5A is a the block diagram of a transmitter including a coder for carrying out the method according to the invention.

The formation of the difference between symbols separated by N intervals from each other must be taken into consideration in the transmitter-side data processing. The block diagram of a transmitter including a color 10 handling this data manipulation and a modulator, is shown in FIG. 5A.

The sequence of data to be transmitted passes via a coder input 1 to the first input of an adder 2. The output of the adder 2 is connected to the coder output 3. The data coming from the adder 2 are at the same time fed to a delay section 4, for example a shift register, and are from there applied to a second input of the adder 2 and are added modulus 2 to the data sequence present at the first input. Accordingly, two symbols separated by N intervals are in each case added in the coder before they are used for the phase shift keying.

Figure 5B:
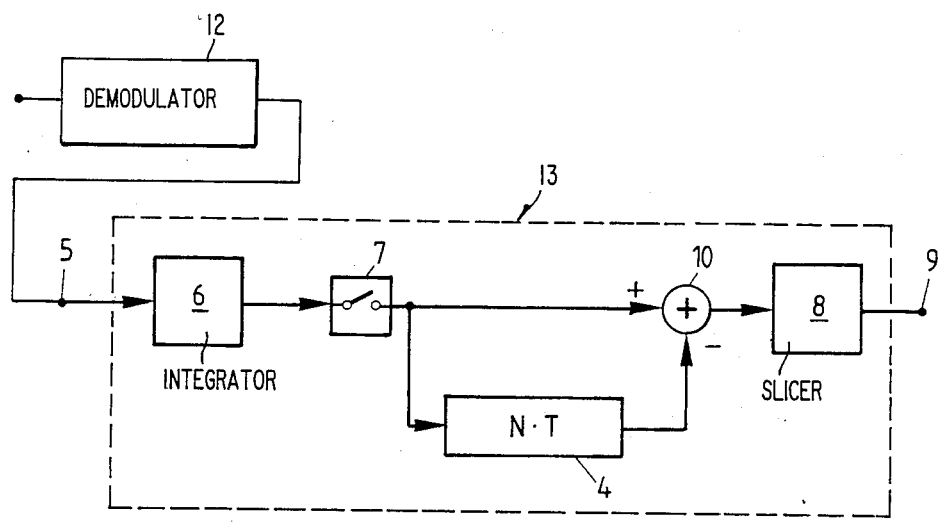
FIG. 5B is a block diagram of a receiver including a detector for carrying out the method according to the invention.

On the receiver side (FIG. 5B), a demodulator 12 demodulates the incoming modulated signal and produces a demodulated baseband signal. The demodulated baseband signal passes to a detector input 5 of detector 13 and from there to an integrator 6 which forms the integral $$\int_{(k-1)T}^{kT} B_r(t)dt \ (k = 1, 2, 3, \ldots) \tag{6}$$

of the received baseband signal $B_r(t)$. The signal passes via a sampler 7 operating at the sampling rate 1/T to the positive input of an adder 10, is at the same time delayed by N·T in a delay section 4 and fed to the negative input of the adder 10.

Thus, the deciding formation of the difference leading to the elimination of the disturbance signal S(t) and cancelling the addition from the transmitter-side coder (FIG. 5A) is performed in the adder 10.

The adder 10 is followed by a so-called slicer 8 which makes a (+1/−1) decision depending on whether the signal coming from the adder 10 is greater than or less than 0. The detected data sequence can be finally picked up at the detector output 9.

All functional blocks also needed for the transmission method according to the invention, such as oscillators, phase modulators and demodulators, can be of a conventional type and are therefore not described in greater detail at this point.

Overall, the invention provides a transmission method which enables disturbance-proof data transmission at a high data rate to be achieved especially with communication via distribution systems with their harmonic disturbances.

Obviously, numerous modifications and variations of the present invention are possible in light of the above teachings. It is therefore to be understood that within the scope of the appended claims, the invention may be practices otherwise than as specifically described herein.

What is claimed as new and desired to be secured by Letters Patent of the United States is:

1. Method for transmitting a sequence of symbols, comprising the steps of:

selecting symbols from the sequence of symbols at a data rate 1/T which is equal to a predetermined number N times a fundamental frequency $f_G$ of a disturbance signal, where $1/T = N f_G$;

coding the selecting symbols by adding to each symbol a symbol which is displaced by a time interval NT, wherein the time interval NT is equal to N times a symbol duration T, said symbol duration T being equal to the inverse of the data rate 1/T;

modulating the coded symbols by differential phase shift keying (DPSK) onto a carrier signal of a frequency $f_0$, said frequency $f_0$ being equal to a predetermined harmonic of the fundamental frequency $f_G$;

demodulating the carrier signal into a baseband signal;

integrating the baseband signal over the period of one symbol duration T;

sampling the integrated baseband signal at a sampling rate which is equal to the data rate 1/T; and forming a phase difference between the sampled baseband signal and the same sampled baseband signal displaced by the time interval NT.

2. Method as claimed in claim 1 further comprising the step of:

feeding the phase difference to a slicer.

3. Method as claimed in claim 2, wherein the predetermined number is N=1.

4. Data transmission system for transmitting data over a power line which is disturbed by harmonics of a given fundamental frequency $f_G$, said data transmission system comprising:

a transmitter comprising, a coder which selects symbols from a sequence of symbols at data rate 1/T, said data rate 1/T being equal to a predetermined number N times the fundamental frequency $f_G$; said coder coding the selected symbols by means of an adder and a delay section, said delay section delaying an output of the adder by a time interval NT, which is equal to N times the inverse of the data rate 1/T, said coder feeding the delayed output back to the adder, and a modulator connected to the coder and modulating the coded symbols by means of differential phase shift keying onto a carrier signal having a frequency $f_0$, which is equal to a predetermined harmonic of the fundamental frequency $f_G$;

a receiver comprising, a demodulator for demodulating said carrier signal into a baseband signal, and a detector comprising an integrator for integrating said baseband signal over a period of one symbol duration T, which is equal to the inverse of the data rate 1/T, a sampler sampling at the data rate 1/T, a second adder with a positive and a negative input and a delay section being connected to an output of said second adder and delaying by the time interval NT and feeding back to the negative input of the adder.

5. Data transmission system as claimed in claim 4, further comprising:

a slicer following the adder.

6. Data transmission system as claimed in claim 5, wherein the predetermined number is N=1.

* * * * *